(12) United States Patent
Kumagai et al.

(10) Patent No.: US 6,858,132 B2
(45) Date of Patent: Feb. 22, 2005

(54) HYDROFINING CATALYST AND HYDROFINING PROCESS

(75) Inventors: Hideaki Kumagai, Toda (JP); Hiroki Koyama, Toda (JP); Kenji Nakamura, Toda (JP); Naoharu Igarashi, Toda (JP); Masayuki Mori, Toda (JP); Takayuki Tsukada, Toda (JP)

(73) Assignee: Japan Energy Corporation, Tokyo (JP)

( * ) Notice: Subject to any disclaimer, the term of this patent is extended or adjusted under 35 U.S.C. 154(b) by 49 days.

(21) Appl. No.: 10/049,047

(22) PCT Filed: Jun. 7, 2001

(86) PCT No.: PCT/JP01/04803

§ 371 (c)(1),
(2), (4) Date: Feb. 7, 2002

(87) PCT Pub. No.: WO01/94012

PCT Pub. Date: Dec. 13, 2001

(65) Prior Publication Data

US 2002/0155045 A1 Oct. 24, 2002

(30) Foreign Application Priority Data

Jun. 5, 2000 (JP) ........................................ 2000-171428

(51) Int. Cl.$^7$ .......................... C10G 45/04; B01J 23/00; B01J 8/02; B01J 8/04
(52) U.S. Cl. ............................ 208/216 PP; 208/216 R; 208/217; 208/251 H; 208/254 H; 502/305; 502/319; 502/320; 502/321; 502/322; 502/323; 502/325; 502/332; 502/333; 502/334; 502/335; 502/336; 502/337; 502/338; 502/339; 502/355; 422/190; 422/191; 422/193
(58) Field of Search ...................... 208/216 PP, 216 R, 208/217, 251 H, 254 H; 502/305, 319, 320, 321, 322, 323, 325, 332, 333, 334, 335, 336, 337, 338, 339, 355; 422/190, 191, 193

(56) References Cited

U.S. PATENT DOCUMENTS

| 4,306,964 A | * | 12/1981 | Angevine .................... 208/210 |
| 4,434,048 A | | 2/1984 | Schindler |
| 4,732,886 A | | 3/1988 | Tomino et al. |
| 4,743,572 A | | 5/1988 | Angevine et al. |
| 4,941,964 A | * | 7/1990 | Dai et al. ............... 208/216 PP |
| 5,300,214 A | | 4/1994 | Creighton et al. |
| 5,399,259 A | * | 3/1995 | Dai et al. ............... 208/216 PP |
| 5,531,885 A | | 7/1996 | Mizutani et al. |
| 5,620,592 A | | 4/1997 | Threlkel |
| 2003/0125198 A1 | * | 7/2003 | Ginestra et al. ............ 502/208 |

FOREIGN PATENT DOCUMENTS

| EP | 1 060 794 A1 | 12/2000 |
| JP | 63-190647 A | 8/1988 |
| JP | 2-95443 A | 4/1990 |
| JP | 7-53968 A | 2/1995 |

* cited by examiner

Primary Examiner—Walter D. Griffin
(74) Attorney, Agent, or Firm—Birch, Stewart, Kolasch & Birch, LLP

(57) ABSTRACT

A heavy oil hydrorefining catalyst of the present invention is such that the total volume of pores with a diameter of 60 nm or less is at least 0.5 mL/g, and the pore diameter distribution has a broad band over a pore diameter range of 8 to 30 nm. The hydrorefining catalyst has excellent desulfurization characteristics and excellent demetalization characteristics, and its performance can be maintained over an extended period. When this catalyst is used in a hydrorefining apparatus equipped with a plurality of catalyst layers, the apparatus can be operated stably at a higher temperature than in the past without decreasing the desulfurization performance, and this also enhances the demetalization characteristics.

11 Claims, 6 Drawing Sheets

US 6,858,132 B2

HYDROFINING CATALYST AND HYDROFINING PROCESS

This application is the national phase under 35 U.S.C. §371 of PCT International Application No. PCT/JP01/04803 which has an International filing date of Jun. 7, 2001, which designated the United States of America.

TECHNICAL FIELD

This invention relates to a catalyst that is suitable for hydrorefining of a heavy oil such as a petroleum residue, and to a hydrorefining method and hydrorefining apparatus in which the catalyst is used.

BACKGROUND ART

Hydrorefining is performed in order to reduce the amount of sulfur, metals, and other such impurities in a heavy oil such as a petroleum residue. This hydrorefining is conducted by bringing the heavy oil into contact with a catalyst in the presence of hydrogen. Because heavy oils contain large quantities of metal, metal and coke build up on the catalyst through prolonged hydrorefining, and this steadily lowers the activity of the catalyst until there is substantially no catalytic activity at all, at which point the catalyst life is at an end. It is desirable in the hydrorefining of a heavy oil to further enhance the impurity removal performance and extend the service life of the catalyst. To this end, there have been studies into methods in which the performance of the hydrorefining catalyst itself is enhanced and, at the same time, a plurality of catalysts are used in combination.

In particular, there was no catalyst up to now that offered both good desulfurization characteristics and good demetalization characteristics. Accordingly, a hydrorefining reaction apparatus made use of a combination of two catalyst layers, consisting of a front catalyst layer packed with a catalyst having excellent demetalization characteristics, and a rear catalyst layer packed with a catalyst having excellent desulfurization characteristics. Unfortunately, it was difficult to achieve a good balance between demetalization characteristics and desulfurization characteristics, and to maintain this balance over an extended period, even if the amount of catalyst packed into the front and rear catalyst layers was adjusted.

No prior art has so far provided a hydrorefining method with which the impurity removal performance is adequately high and a long catalyst service life can be achieved. For instance, the impurity removal performance can be improved by raising the reaction temperature, but this accelerates the build-up of coke and so forth and quickly diminishes the activity of the catalyst, so stable operation over an extended period is impossible. Furthermore, the performance of the individual catalysts can be improved through modification of the hydrorefining catalysts, but when these catalysts are combined their performance is sometimes inadequate. Also, the demand for middle distillate products such as kerosene and gas oil is higher than that for heavy oils, so it is desirable to obtain a greater quantity of light oil through a cracking reaction that occurs simultaneously with the hydrorefining of a heavy oil.

The present invention was conceived in an effort to solve these problems encountered with prior art, and a first object thereof is to provide a catalyst with excellent demetalization characteristics and desulfurization characteristics. A second object of the present invention is to provide a hydrorefining method and a hydrorefining apparatus with which removal performance for impurities such as metals or sulfur is high and can be maintained high over an extended period, and with which a larger quantity of light distillates can be obtained.

A first aspect of the present invention provides a hydrorefining catalyst comprising a porous carrier and a hydrogenation active metal supported thereon, wherein the total volume of pores with a diameter of 60 nm or less is at least 0.5 mL/g; (i) the volume of pores with a diameter of 8 nm or less is no more than 8% of the total pore volume; (ii) the volume of pores with a diameter of 8 to 13 nm is at least 15% of the total pore volume; (iii) the volume of pores with a diameter of 13 to 18 nm is not more than 30% of the total pore volume; (iv) the volume of pores with a diameter of 18 to 30 nm is at least 35% of the total pore volume; and (v) the volume of pores with a diameter of 30 to 60 nm is no more than 10% of the total pore volume.

As indicated for the characteristics of catalyst #011 in FIG. 1, the catalyst of the present invention has a characteristic pore distribution having a relatively broad band over a pore diameter range of 8 to 30 nm. Accordingly to this characteristic pore distribution, the hydrorefining catalyst has excellent desulfurization characteristics as well as excellent demetalization characteristics, and it can be seen that the performance thereof is maintained over an extended period. Using this catalyst in a hydrorefining apparatus equipped with a plurality of catalyst layers allows the apparatus to operate at a high temperature than in the conventional apparatus without diminishing the desulfurization performance, and this also enhances the demetalization characteristics. Also, a greater quantity of light distillates is obtained because the cracking rate of the heavy oil is higher. It can also be seen that the carrier having the above pore diameter distribution as well as the catalyst provided therewith has excellent mechanical strength.

A second aspect of the present invention provides an apparatus for hydrorefining heavy oils, comprising a first catalyst layer; a second catalyst layer located downstream from the first catalyst layer and a third catalyst layer located downstream from the second catalyst layer; wherein the effective metal build-up amount of the demetalization reaction of the catalyst in the first catalyst layer is at least 70, the effective metal build-up amount of the demetalization reaction of the catalyst in the second catalyst layer is at least 50, and the effective metal build-up amount of the desulfurization reaction is at least 50. The combined volume of the catalyst in the first and second catalyst layers in the hydrorefining apparatus is at least 45% of the combined volume of the catalyst in the first to third catalyst layers, and the volume of the catalyst in the second catalyst layer is at least 10% of the combined volume of the catalyst in the first to third catalyst layers.

With the hydrorefining apparatus of the present invention, the first catalyst layer (upper catalyst layer) is provided with a catalyst having excellent demetalization characteristics, while the second catalyst layer (middle catalyst layer) is provided with a catalyst having excellent demetalization characteristics and desulfurization characteristics, so excellent demetalization characteristics and desulfurization characteristics can be maintained over an extended period. Also, a greater quantity of light distillates is obtained from this hydrorefining apparatus.

With the hydrorefining apparatus of the present invention, the catalyst in the first catalyst layer may be one that has a refractory porous carrier and a hydrogenation active metal supported on the carrier, and one in which (a) the volume of pores with a diameter of 50 nm or less is at least 0.4 mL/g as determined by nitrogen adsorption method; (b) the volume of pores with a diameter of at least 50 nm is at least 0.2 mL/g as determined by mercury intrusion porosimetry; and (c) the volume of pores with a diameter of at least 2000 nm is 0.1 mL/g or less as determined by mercury intrusion porosimetry. The catalyst in the second catalyst layer may be the above-mentioned inventive catalyst.

A third aspect of the present invention provides heavy oil hydrorefining method, comprising the steps of preparing a first catalyst layer, a second catalyst layer located downstream from the first catalyst layer and a third catalyst layer located downstream from the second catalyst layer; and bringing a heavy oil into contact with the first, second and third catalyst layers in the presence of hydrogen, wherein the effective metal build-up amount of the demetalization reaction of the catalyst in the first catalyst layer is at least 70, the effective metal build-up amount of the demetalization reaction of the catalyst in the second catalyst layer is at least 50, and the effective metal build-up amount of the desulfurization reaction is at least 50.

BEST MODE FOR CARRYING OUT THE INVENTION

Upper Catalyst

Figure 1:
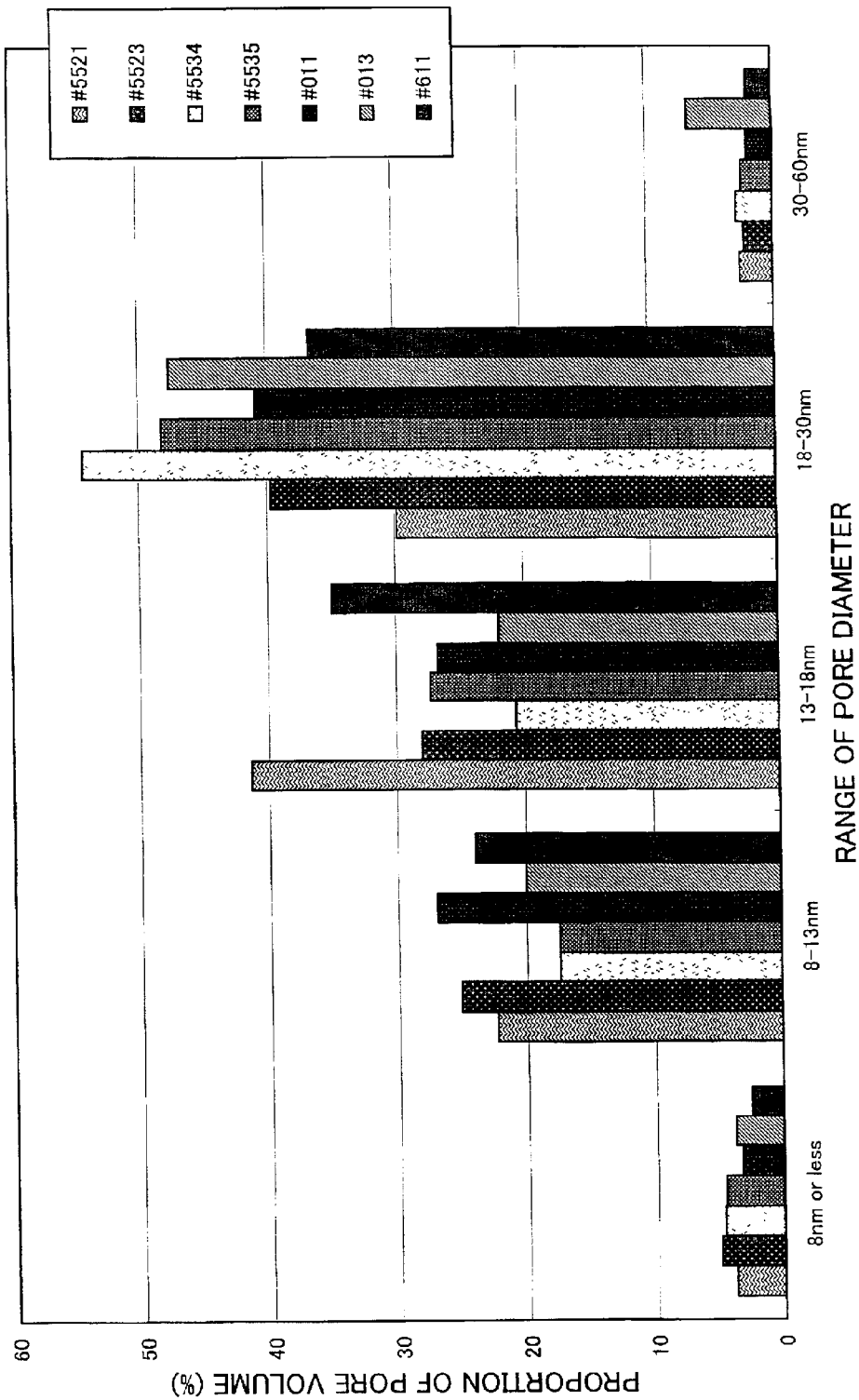
FIG. 1 is a graph of the pore diameter distribution of the porous carrier according to an example of the present invention.

The catalyst packed into the upper catalyst layer (hereinafter referred to as the upper catalyst) is such that the effective metal build-up amount of the demetalization reaction is at least 70, with at least 75 being preferable and 80 to 200 being particularly favorable. If the effective metal build-up amount of the demetalization reaction is less than 70, there will be pronounced catalyst degradation due to metal build-up, which precludes a long service life.

As to the favorable pore structure in the upper catalyst as measured by nitrogen adsorption method, it is preferable if the volume of pores with a diameter of 50 nm or less is at least 0.4 cm$^3$/g, and particularly 0.6 to 1.1 cm$^3$/g, the median pore diameter in the distribution of pores with a diameter of 2 to 60 nm is 6 to 20 nm, and particularly 8 to 15 nm, and the specific surface area is 100 to 350 m$^2$/g. The decrease in demetalization activity caused by metal build-up can be reduced by setting the volume of pores with a diameter of 50 nm or less to at least 0.4 cm$^3$/g.

The median pore diameter can be measured as the pore diameter at which the cumulative pore volume from the larger pore volume side is half the pore volume (V/2), from the relationship between pore diameter and pore volume calculated by the BJH method using as the pore volume (V) the volume measured from the amount of nitrogen gas adsorbed (calculated as a liquid) at a relative pressure of 0.967 in a nitrogen gas removal process. The pore distribution at a pore diameter of approximately 2 to 60 nm can be measured by this nitrogen adsorption method. The BJH method is disclosed in the Journal of the American Chemical Society, Vol. 73, p. 373 (1951).

As to the favorable pore structure in the upper catalyst as measured by mercury intrusion porosimetry, it is preferable if the volume of pores with a diameter of at least 50 nm is at least 0.2 cm$^3$/g, and particularly 0.25 to 0.40 cm$^3$/g, and the volume of pores with a diameter of at least 2000 nm is 0.1 cm$^3$/g or less, and particularly 0.05 cm$^3$/g or less, and especially 0.01 cm$^3$/g or less. Setting the volume of pores with a diameter of at least 50 nm to be at least 0.2 cm$^3$/g allows the demetalization activity to be increased, and setting the volume of pores with a diameter of at least 2000 nm to be 0.1 cm$^3$/g or less allows the mechanical strength of the upper catalyst to be increased.

Measurement by mercury intrusion porosimetry was conducted at a mercury contact angle of 140° and a surface tension of 480 dyne/cm, within a pressure range of 2 to 4225 kg/cm$^2$ (30.4 to 60,000 psia).

The porous inorganic oxide carrier used for the upper catalyst can be an oxide of an element from Groups 2, 4, 13, and 14 of the Periodic Table (this Periodic Table is in accordance with the IUPAC 1990 recommendations). Of these, silica, alumina, magnesia, zirconia, boria, calcia, and the like are preferred, and these may be used singly or in combinations of two or more types. Particularly favorable are alumina (those having γ, δ, η, χ, or other such crystal structures), silica-alumina, silica, alumina-magnesia, silica-magnesia, and alumina-silica-magnesia, with γ-alumina being especially good. The proportion of the catalyst carrier accounted for by alumina should be at least 50 wt %, and particularly at least 70%, calculated as $Al_2O_3$.

The hydrogenation active metal component supported on the porous inorganic oxide carrier can be elements from Groups 6, 8, 9, and 10 of the Periodic Table, with the use of molybdenum and/or tungsten being particularly favorable, and in addition nickel and/or cobalt can also be used. It is preferable for these elements to be supported on the carrier in the form of a metal, oxide, or sulfide. It is also preferable for the amount in which the hydrogenation active metal components are contained (as metal elements) to be 0.1 to 25 wt %, and particularly 0.5 to 15 wt %, and especially 1 to 15 wt %, with respect to the catalyst weight. A compound of phosphorous and/or boron (usually in the form of an oxide) is preferably added to the catalyst in an amount of 0.1 to 20 wt %, and particularly 0.2 to 5 wt %, as the element weight, and this increases the demetalization activity.

The upper catalyst is preferably manufactured by mixing, forming, and calcining a raw material powder whose main component is γ-alumina. It is preferable for the raw material powder to contain γ-alumina in an amount of at least 60%, and particularly at least 75%, with respect to the catalyst weight.

It is preferable for the raw material powder to be a powder with an average particle diameter of at least 1 μm and in which the volume of pores with a diameter or 60 nm or less is at least 0.4 cm$^3$/g (and preferably 0.6 to 1.0 cm$^3$/g) as measured by nitrogen adsorption method. If the pore volume of the raw material powder is less than 0.4 cm$^3$/g, then the volume of pores with a diameter of 50 nm or less in the upper catalyst will be small, so the effective metal build-up amount will also be small. If the average particle diameter is less than 1 μm, then the volume of pores with a diameter of at least 50 nm in the upper catalyst will be small, resulting in lower demetalization activity. If the average particle diameter exceeds 300 μm, then the volume of pores with a diameter of at least 2000 nm in the upper catalyst will be large, resulting in lower mechanical strength of the upper catalyst. The "average particle diameter" as used in this specification can be measured as the median diameter, measured by a standard wet laser light scattering method.

It is preferable for this raw material powder to be γ-alumina with an average particle diameter of 300 μm or less, and particularly 10 to 100 μm. This γ-alumina is preferably the product obtained by calcining pseudo-boehmite at 450 to 850° C., for example, a used catalyst, and particularly a used hydrorefining catalyst in which the hydrogenation active metal components are supported on γ-alumina. The raw material powder may also be pulverized in a ball mill, roll mill, jet mill, pulverizer, or the like in order to obtain the required average particle diameter.

There are no particular restrictions on the forming of the raw material powder, but an example is adding water, an organic solvent, or the like to the raw material powder and forming this in the form of paste or clay. This forming can be performed by extrusion forming, press forming, coating of a worked sheet, or the like. A formed carrier can be obtained by drying and, if needed, calcination after the formed material. A raw material powder in the form of a gel or slurry can be formed into beads by being dispersed and dried in a dry gas (such as spray drying). It is also possible for a raw material powder in the form of a sol or slurry to be formed into beads in a liquid. Forming methods in which the raw material powder is formed directly include a method in which a forming auxiliary is added as needed to the raw material powder and press forming is performed in a tablet-making machine, and a method in which the forming involves rolling granulation.

The mixing of the raw material powder and liquid can be accomplished with any mixer, kneader, or the like commonly used in catalyst preparation. One favorable method involves adding water to the above-mentioned raw material powder and then mixing with agitator blades. Normally, water is added as the liquid here, but this liquid may instead be an alcohol, a ketone, or another organic compound. Nitric acid, acetic acid, formic acid, and other such acids, ammonia and other such bases, organic compounds, surfactants, active components, and so forth may also be added and mixed, and it is particularly favorable to add a forming auxiliary composed of an organic compound such as water-soluble cellulose ether in an amount of 0.2 to 5 wt %, and particularly 0.5 to 3 wt %, with respect to the raw material powder.

The material can be easily formed into pellets, a honeycomb shape, or another shape by using a plunger-type extruder, a screw-type extruder, or another such apparatus. The material is usually formed into beads or hollow or solid cylinders with a diameter of 0.5 to 6 mm, or into a shape such as columns with a trilobe or quadrilobe cross section. After forming, the product is dried between normal temperature and 150° C., and preferably between 100 and 140° C., after which it is calcined for at least 0.5 hour at 350 to 900° C., and preferably for 0.5 to 5 hours at 500 to 850° C.

Supporting, kneading, or another such method can be employed as the method for supporting the hydrogenation active metal components on the upper catalyst. This supporting can be carried out at one or more stages, including at the stage of the γ-alumina raw material, the raw material powder, and after the forming and calcining of the raw material powder. For instance, when a used hydrorefining catalyst is used as the γ-alumina raw material, hydrogenation active metal components are already supported on the γ-alumina raw material. Any commonly used impregnation method, such as pore filling, heating impregnation, vacuum impregnation, dipping, or another such known means can be used as the method for supporting the hydrogenation active metal components. After impregnation with the metal components, it is preferable to dry the catalyst for 10 minutes to 24 hours at a temperature of 80 to 200° C., and calcine it for 15 minutes to 10 hours at 400 to 600° C., and particularly 450 to 550° C. The kneading method may involve adding the hydrogenation active metal components to the raw material ahead of time, or mixing and kneading them along with the raw material.

The hydrorefining catalyst disclosed by the present applicant in WO00/33957 (PCT/JP99/06760) can be used favorably for the upper catalyst.

Middle Catalyst

The catalyst packed into the middle catalyst layer (hereinafter referred to as the middle catalyst) is such that the effective metal build-up amount in the demetalization reaction is at least 50, and the effective metal build-up amount in the desulfurization reaction is at least 50. It is preferable for the effective metal build-up amount in the demetalization reaction to be at least 55, and particularly 60 to 100. It is also preferable for the effective metal build-up amount in the desulfurization reaction to be at least 55, and particularly 60 to 100. If the effective metal build-up amount in the demetalization reaction and the effective metal build-up amount in the desulfurization reaction are less than 50, the build-up of metals will cause marked degradation of the catalyst, which precludes a long service life. The ratio of the reaction rate constant $k_{h2}$ for compounds hardly desulfurized by the middle catalyst versus the reaction rate constant $k_{h3}$ for compounds hardly desulfurized by the lower catalyst ($k_{h2}/k_{h3}$; this will hereinafter also be referred to as the hard desulfurization reaction rate constant ratio) is at least 0.5, and preferably 0.5 to 0.9, and particularly 0.6 to 0.8, with 0.6 to 0.7 being especially good. Desulfurization characteristics will be inadequate if the hard desulfurization reaction rate constant ratio is less than 0.5.

Table 1 lists preferably pore structures for the middle catalyst as measured by nitrogen adsorption method. Having a pore distribution such as this results in a hydrorefining catalyst with superior demetalization characteristics and desulfurization characteristics, with a longer service life. Also, it is preferable for the median pore diameter in a pore diameter distribution of 2 to 60 nm to be 10 to 25 nm, and particularly 15 to 20 nm, and for the specific surface area to be 100 to 350 m²/g.

TABLE 1

| | Preferable range | Particularly preferable range |
|---|---|---|
| Total volume (mL/g) of pores of 60 nm or less | 0.5 more | 0.6–0.9 |
| Proportion of total pore volume | | |
| Pore diameter range | | |
| 8 nm or less | 8% or less | 6% or less |
| 8 nm–13 nm | 15% or more | 15–30% |
| 13 nm–18 nm | 30% or less | 20–30% |
| 18 nm–30 nm | 35% or more | 38–50% |
| 30 nm–60 nm | 10% or less | 8% or less |

A preferable pore structure in the middle catalyst as measured by nitrogen adsorption method is one in which the volume of pores with a diameter of at least 50 nm is 0.2 $cm^3/g$ or less, and particularly 0.1 $cm^3/g$ or less. Setting the volume of pores with a diameter of at least 50 nm to be 0.2 $cm^3/g$ or less increases the mechanical strength of the middle catalyst.

The porous inorganic oxide carrier and hydrogenation active metal components that make up the middle catalyst are the same as those in the upper catalyst, but the amount in which the hydrogenation active metal components are contained, as metal elements, is preferably 0.1 to 25 wt %, and particularly 0.5 to 15 wt %, and especially 2.5 to 15 wt %, with respect to the catalyst weight.

The middle catalyst is preferably manufactured by mixing, forming, and calcining a raw material whose main component is an alumina such as pseudo-boehmite (including hydrous alumina). A pseudo-boehmite powder is preferably used as the raw material, but a γ-alumina powder can also be added. This γ-alumina powder can also be one obtained by pulverizing a used catalyst, and particularly a used hydrorefining catalyst in which hydrogenation active metal components are supported on γ-alumina, to an average particle diameter of 200 μm or less, and preferably 1 to 100 μm.

Since the final pore distribution of a catalyst is determined by the pore distribution of the pseudo-boehmite used as the raw material or by the kneaded and formed material, the inventors, in an effort to obtain the desired pore distribution of a catalyst, focused their study on the fact that the crystallite diameter (indicating the size of the primary crystals, or crystallites) of the raw material pseudo-boehmite and the dispersibility index (indicating the ease of disentanglement during kneading) are important factors.

As a result, they discovered that to obtain the required pore distribution in the middle catalyst, the pseudo-boehmite powder that serves as the raw material should have a dispersibility index of 0.05 to 0.8, and particularly 0.1 to 0.5, a crystallite diameter in the (020) direction of 2.5 to 6.0 nm, and particularly 2.5 to 4.0 nm, and a crystallite diameter in the (120) direction of 4.0 to 10 nm, and particularly 4.0 to 6.0 nm.

To find the dispersibility index, 6 g of the pseudo-boehmite powder being evaluated, 30 cc of water, and 60 cc of 0.1 N nitric acid are put in a vessel and then broken up in a blender to produce a pseudo-boehmite slurry, this slurry is transferred to a centrifuge tube and centrifuged for 3 minutes at 3000 rpm, the suspended portion is separated from the precipitate by decantation and transferred into another vessel, and this material is dried and the solids weighed. The dispersibility index is the quotient of dividing the solid weight of the suspended portion by the total solid weight, which is the sum of the solid weight of the suspended portion and the solid weight of the precipitate.

The crystallite diameter was determined by using the Scherrer method to find the apparent crystallite size in the (020) and (120) directions for pseudo-boehmite from the X-ray diffraction pattern of a pseudo-boehmite powder. α-alumina produced by calcining high-purity pseudo-boehmite for 36 hours at 1600° C. was used as an internal standard sample.

It is best for the pseudo-boehmite to be kneaded before forming, and this kneading can be carried out in any mixer, kneader, or the like commonly used in catalyst preparation. One favorable method involves adding water to the above-mentioned raw material powder and then mixing with agitator blades. Normally, water is added as the liquid here, but this liquid may instead be an alcohol, a ketone, or another organic compound. Nitric acid, acetic acid, formic acid, and other such acids, ammonia and other such bases, organic compounds, surfactants, active components, and so forth may also be added and mixed, and it is particularly favorable to add and knead water or an alkaline or neutral aqueous solution, such as aqueous ammonia, ion exchange water, or the like. The forming of the raw material and the subsequent calcining and supporting of the hydrogenation active metal components can be carried out in the same manner as for the upper catalyst.

Lower Catalyst

The catalyst packed into the lower catalyst layer (hereinafter referred to as the lower catalyst) can be a so-called desulfurization catalyst. As to the favorable pore structure in the lower catalyst as measured by nitrogen adsorption method, it is preferable if the volume of pores with a diameter of 60 nm or less is at least 0.5 $cm^3/g$, and particularly 0.6 to 1.0 $cm^3/g$, the median pore diameter in the distribution of pores with a diameter of 2 to 60 nm is 5 to 15 nm, and particularly 7 to 13 nm, and the specific surface area is 150 to 350 $m^2/g$. As to the favorable pore structure in the lower catalyst as measured by mercury intrusion porosimetry, it is preferable if the volume of pores with a diameter of at least 50 nm is no more than 0.2 $cm^3/g$, and particularly no more than 0.1 $cm^3/g$. Setting the volume of pores with a diameter of at least 50 nm to be no more than 0.2 $cm^3/g$ allows the mechanical strength of the lower catalyst to be increased.

The porous inorganic oxide carrier and hydrogenation active metal components that make up the lower catalyst are the same as those in the upper catalyst, but the amount in which the hydrogenation active metal components are contained, as metal elements, is preferably 0.1 to 25 wt %, and particularly 0.5 to 15 wt %, and especially 2.5 to 15 wt %, with respect to the catalyst weight.

The lower catalyst is preferably manufactured by mixing, forming, and calcining a raw material whose main component is pseudo-boehmite. This raw material is preferably kneaded before forming, and this kneading can be carried out in any mixer, kneader, or the like commonly used in catalyst preparation. One favorable method involves adding water to the above-mentioned raw material powder and then mixing with agitator blades. Normally, water is added as the liquid here, but this liquid may instead be an alcohol, a ketone, or another organic compound. Nitric acid, acetic acid, formic acid, and other such acids, ammonia and other such bases, organic compounds, surfactants, active components, and so forth may also be added and mixed. The forming of the raw material and the subsequent calcining and supporting of the hydrogenation active metal components can be carried out in the same manner as for the upper catalyst.

Hydrorefining Conditions

Hydrorefining in the present invention is carried out by successively bringing the heavy oil to be treated into contact, along with hydrogen, with the upper catalyst layer, the middle catalyst layer, and the lower catalyst layer. These catalyst layers may all be contained in the same reactor, or they may be divided up and contained in a plurality of reactors. The hydrogen may also be injected into the various catalyst layers. Other hydrorefining or other such steps may be further combined before or after this step.

The total volume of the upper catalyst layer and the middle catalyst layer must be at least 45% of the overall catalyst layer volume, and the volume of the middle catalyst layer must be at least 10%. The overall catalyst layer volume is the combined volume of the upper catalyst layer, middle catalyst layer, and lower catalyst layer, and does not include the volume of any guard catalyst, support catalyst, or other such catalyst lacking sufficient performance capability as a hydrorefining catalyst, that is, a catalyst that does not satisfy the required characteristics of the upper catalyst layer, middle catalyst layer, or lower catalyst layer. Table 2 shows the favorable volume percentages of the various catalyst layers with respect to the overall catalyst layer volume. The various catalyst layers may each be packed with just one type of catalyst, or a plurality of catalysts that satisfy the required characteristics may be combined. Table 2 also shows the favorable reaction conditions.

TABLE 2

|  | Preferable range | Particularly preferable range |
|---|---|---|
| Volume of upper catalyst layer | 10% or more | 10–40% |
| Volume of middle catalyst layer | 20% or more | 20–50% |
| Volume of lower catalyst layer | 50% or less | 15–45% |
| Reaction temperature (° C.) | 300–450 | 320–430 |
| Hydrogen partial pressure (MPa) | 3–25 | 8–20 |
| Liquid space velocity (hr$^{-1}$) | 0.1–10 | 0.15–2 |
| Hydrogen/oil ratio (L/L) | 100–4000 | 300–1500 |

Heavy Oil

The heavy oil that is the subject of hydrorefining has as its main component a fraction with a boiling point of at least 360° C., and preferably contains at least 50%, and particularly at least 70%, a fraction with a boiling point of at least 360° C. Examples of such heavy oils include various heavy fractions and residual oils obtained by the atmospheric distillation or vacuum distillation of crude oil, tar sand, shale oil, coal liquefaction oil, or the like, as well as these heavy oils that have undergone a treatment such as cracking, isomerization, modification, or solvent extraction. A heavy oil containing vanadium and nickel as its metal components in an amount of at least 45 weight ppm (as metal element weight), and particularly at least 60 weight ppm, can be the subject of this treatment.

The present invention allows a high cracking rate to be obtained over an extended period. More specifically, an average cracking rate of at least 14% can be obtained over a running period of 250 days or longer, and particularly 300 days or longer. The average cracking rate is determined by averaging the cracking rate over the running period, and the cracking rate is defined by the following equation (1).

$$\text{cracking rate} = \left(1 - \frac{\text{(weight of fraction with boiling point} \geq 360° \text{ C. in produced oil)}}{\text{(weight of fraction with boiling point} \geq 360° \text{ C. in feed oil)}}\right) \times 100 \quad (1)$$

Effective Metal Build-up Amount

The effective metal build-up amount in the demetalization reaction is the amount of vanadium and nickel build-up at the point when metals have built up on the catalyst through hydrorefining so that the activity is diminished and the demetalization rate has dropped to 50%, and is defined as the amount (expressed in grams) of built-up vanadium and nickel per 100 g of initial catalyst. The effective metal build-up amount in the desulfurization reaction is the amount of vanadium and nickel build-up at the point when metals have built up on the catalyst through hydrorefining so that the activity is diminished and the desulfurization rate has dropped to 40%, and is defined as the amount (expressed in grams) of built-up vanadium and nickel per 100 g of initial catalyst. The hydrorefining performed in catalyst evaluation is conducted at a reaction temperature of 390° C., a hydrogen partial pressure of 13.7 MPa, a liquid space velocity of 1.0 hr$^{-1}$, and a hydrogen/oil ratio of 670 L/L. It is preferable to use Boscan crude oil as the feed oil.

Reaction Rate Constant for Hard Desulfurization Compounds

Sulfur compounds can be classified into two types: those that easily undergo desulfurization and those that do not. The reaction rate constant $k0_h$ with respect to hard desulfurization compounds at a reaction temperature of 380° C. is termed the reaction rate constant of hard desulfurization compounds. The reaction rate constant $k0_h$ for hard desulfurization compounds and the reaction rate constant $k0_e$ for easy desulfurization compounds can be expressed by the following equations (2 and 3) as first order reactions of the sulfur concentration C and the concentration change ΔC thereof with sulfur compounds.

$$k0_h = -LHSV \times \ln(1 - \Delta C_h / C_{0h}) \quad (2)$$

$$k0_e = -LHSV \times \ln(1 - \Delta C_e / C_{0e}) \quad (3)$$

(Here, $\Delta C_h$ and $\Delta C_e$ are the change in concentration of hard desulfurization compounds and easy desulfurization compounds; $C_{0h}$ and $C_{0e}$ are the concentrations of hard desulfurization compounds and easy desulfurization compounds in the feed oil; and LHSV is the liquid hourly space velocity.)

The sulfur concentration change ΔC can be measured at four or more different LHSV values, and the reaction rate constant $k0_h$ calculated with respect to the hard desulfurization compounds. A favorable LHSV range is 0.3 to 2 hr$^{-1}$. More specifically, as shown in the following equation (4), the sulfur concentration of the produced oil is measured at different LHSV values, and the measured conversion rate $X_{obs}$ is found. The reaction rate constant $k0_h$ and the reaction rate constant $k0_e$ can be calculated with respect to hard desulfurization compounds by the method of least squares such that the difference between the conversion rate $X_{obs}$ and the conversion rate $X_{calc}$ calculated from equation (5) is minimized.

$$X_{obs} = \Delta C / C = (\Delta C_e + \Delta C_h) / (C_{0e} + C_{0h}) \quad (4)$$

$$X_{calc} = a \times (1 - \exp(-k0_e / LHSV)) + (1-a) \times (1 - \exp(-k0_h / LHSV)) \quad (5)$$

(Here, $\Delta C_h$ and $\Delta C_e$ are the change in concentration of hard desulfurization compounds and easy desulfurization compounds; $C_{0h}$ and $C_{0e}$ are the concentrations of hard desulfurization compounds and easy desulfurization compounds in the feed oil; LHSV is the liquid hourly space velocity; and a is the proportion of the total sulfur compounds accounted for by easy desulfurization compounds in the feed oil ($C0_e/(C0_e + C0_h)$).)

EXAMPLES

The present invention will now be described on the basis of examples, but should not be construed to be limited by these examples.

Preparation of Catalyst #100

A commercially available pseudo-boehmite powder X was calcined at 600° C. to produce a raw material powder composed of γ-alumina. The (020) crystallite diameter of this pseudo-boehmite powder X was 2.70 nm, and the (120) crystallite diameter was 4.50 nm. The volume of pores with a diameter of 60 nm or less in the raw material powder composed of γ-alumina was 0.82 cm³/g, and the average particle diameter was 12 μm. 2120 cc of ion exchange water and 52 g of water-soluble cellulose ether were added to 1.5 kg of this raw material powder composed of γ-alumina, and the components were kneaded and extruded from a quadrilobe opening (maximum outside diameter: 1.9 mm) of a dual-arm extruder. This formed article was dried for 15 hours at 130° C. using a dryer, after which it was made into a carrier by being calcined for 1 hour at 800° C. under an air flow. The carrier was impregnated with an acidic aqueous solution containing molybdenum, nickel, and phosphorus by spraying, and then dried for 20 hours at 130° C. This product was then calcined for 25 minutes at 450° C. under an air flow to prepare catalyst #100, which contained 3.0 wt % molybdenum, 1.0 wt % nickel, and 0.6 wt % phosphorus (as element weight).

Preparation of Catalysts #011 and #013

A commercially available pseudo-boehmite powder Y was used, which had a dispersibility index of 0.20, a (020) crystallite diameter of 2.70 nm, and a (120) crystallite diameter of 4.50 nm. 1 L of 1 wt % aqueous ammonia and 0.9 L of water were added to 2 kg of this pseudo-boehmite powder, and the components were kneaded for 1 hour. This mixture was made into a quadrilobe formed article (maximum outside diameter: 1.9 mm) using a dual-arm extruder. This article was dried for 10 hours at 130° C., then calcined for 1 hour at 800° C. to obtain a carrier composed of γ-alumina. This carrier was impregnated by spraying with an ammonium molybdate aqueous solution such that the molybdenum content in the catalyst would be 6 wt % (as element weight), which was dried for 15 hours at 130° C., after which the carrier was further impregnated by spraying with a nickel nitrate aqueous solution such that the nickel content in the catalyst would be 1.5 wt % (as element weight), and this was dried for 15 hours at 130° C. This product was calcined for 25 minutes at 450° C. under an air flow to prepare catalyst #011, which contained 6 wt % molybdenum and 1.5 wt % nickel (as element weight).

Other than changing the calcination time at 800° C. to 1.5 hours, catalyst #013 was prepared under the same conditions as catalyst #011.

Preparation of Other Catalysts

Catalysts similar to catalyst #011 were prepared as follows.

Synthesis of Pseudo-boehmite Powder

300 L of water was heated to 65° C. in a neutralization precipitation tank, and 125 L of a sodium aluminate aqueous solution (1 M concentration) and 127 L of an aluminum sulfate aqueous solution (0.5 M concentration) heated to 60° C. were simultaneously sent into this neutralization precipitation tank. The feed rate of the aluminum sulfate was fine-tuned so that the pH of the mixed solution in the neutralization precipitation tank would be a steady 9.0. A precipitation reaction occurred while the solutions were being fed in, and the temperature of the solutions was held at 65° C. during the production of precipitate. The feed of the sodium aluminate aqueous solution and the aluminum sulfate aqueous solution was halted 22 minutes after the start of the feed, and the temperature of the solutions was lowered to 60° C., after which the solutions were stirred while held at this temperature to conduct aging for 30 minutes. The slurry obtained from this aging was filtered and washed to obtain solids. The solids were dried in a spray dryer to obtain a pseudo-boehmite powder A.

The pseudo-boehmite powder A had a dispersibility index of 0.46, a (020) crystallite diameter of 2.41 nm, and a (120) crystallite diameter of 3.81 nm.

The raw material sodium aluminate aqueous solution and aluminum sulfate aqueous solution were produced by dissolving an aluminum alloy (JIS 6063 alloy having the chemical components set forth in H4100) in sodium hydroxide and sulfuric acid, respectively.

Other than adjusting the temperature of the solution during precipitate production to 70° C., a pseudo-boehmite powder B was synthesized under the same conditions as pseudo-boehmite powder A. The pseudo-boehmite powder B had a dispersibility index of 0.22, a (020) crystallite diameter of 2.83 nm, and a (120) crystallite diameter of 4.57 nm.

Other than adjusting the temperature of the solution during precipitate production to 70° C., and using a commercially available sodium aluminate (made by Showa Denko) and aluminum sulfate (made by Nippon Light Metal) as the raw materials, a pseudo-boehmite powder C was synthesized under the same conditions as pseudo-boehmite powder A. The pseudo-boehmite powder C had a dispersibility index of 0.41, a (020) crystallite diameter of 3.32 nm, and a (120) crystallite diameter of 4.94 nm.

Other than using pseudo-boehmite powder A, pseudo-boehmite powder B, and pseudo-boehmite powder C, and adding and kneading 1.5 L of water to 1.5 kg of each of these pseudo-boehmite powders, catalyst #5521, catalyst #5523, and catalyst #5534, respectively, were prepared under the same conditions as catalyst #011. Other than using pseudo-boehmite powder C, and kneading 0.8 L of water and 0.8 L of 1% nitric acid to 1.5 kg of the pseudo-boehmite powder C, catalyst #5535 was prepared under the same conditions as catalyst #011.

Procuring Other Catalysts

HOP 606 made by Orient Catalyst (amount of metal supported: 3 wt % of Mo and 1 wt % of Ni) was used for catalyst #606, HOP 611 made by Orient Catalyst (amount of metal supported: 6 wt % of Mo, 1.5 wt % of Ni and 1 wt % of P) was used for catalyst #611, and HOP 802 made by Orient Catalyst (amount of metal supported: 8 wt % of Mo and 2.2 wt % of Ni) was used for catalyst #802. In the catalyst evaluation discussed below, sulfurization was performed by previously bringing the catalyst into contact with a gas oil in which 1 wt % carbon disulfide had been dissolved.

Evaluation of Reaction Rate Constant 100 cm³ of catalyst was packed into a reactor with an inside diameter of 25 mm and a length of 1000 mm. Using the atmospheric distillation residue shown in Table 3 as the feed oil, a reaction was conducted at a reaction temperature of 380° C., a hydrogen partial pressure of 14.0 MPa, and a hydrogen/oil ratio of 1000 L/L, and with the average liquid space velocity of varied at 0.33, 0.66, 1.0, and 2.0. The feed oil sulfur concentration C and the sulfur concentration change ΔC were measured to obtain the conversion rate ΔC/C in each case. The reaction rate constant $k0_h$ with respect to hard desulfurization compounds and the reaction rate constant $k0_e$ with respect to easy desulfurization compounds were found by the method of least squares, plugging the value of ΔC/C into equations 2 to 5 for the above four LHSV values and for the original point, at which 1/LHSV=0.

TABLE 3

| | Feed oil | | |
|---|---|---|---|
| Source | Atmospheric distillation residue | Mixed distillation residue | Boscan crude oil |
| | Atmospheric distillation residue from Kuwait crude oil | Mixture of 80% atmospheric distillation residue from Kuwait crude oil and 20% vacuum distillation oil | Boscan crude oil |
| 10% distillation temperature (° C.) | 384 | 395 | 314 |
| 30% distillation temperature (° C.) | 453 | 479 | 476 |
| 50% distillation temperature (° C.) | 526 | 560 | 576 |
| Density | 0.972 | 0.976 | 0.998 |
| Sulfur (wt %) | 3.88 | 4.02 | 4.98 |
| Vanadium (wt ppm) | 52 | 62 | 1197 |
| Nickel (wt ppm) | 15 | 21 | 116 |

Evaluation of Effective Metal Build-up Amount

Figure 2:
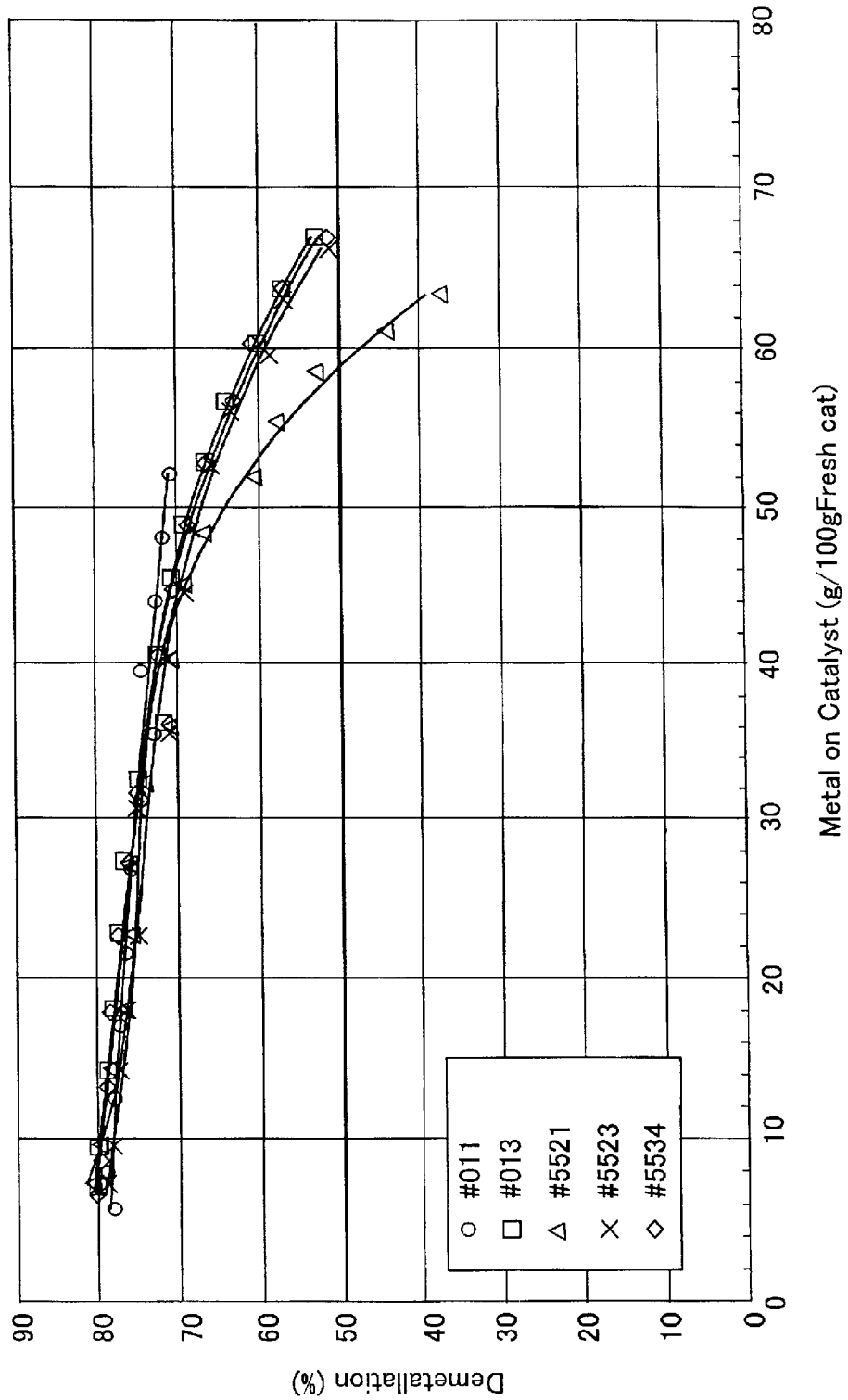
FIG. 2 is a graph of the demetalization rate versus the amount of nickel and vanadium build-up of a catalyst manufactured in an example.

Two reactors with an inside diameter of 25 mm and a length of 1000 mm were packed with equal amounts (200 cm$^3$) of catalyst, and the relationship between demetalization rate and desulfurization rate with respect to the amounts of nickel and vanadium build-up were measured for each catalyst using the Boscan crude oil shown in Table 3 as the feed oil, under reaction conditions comprising a reaction temperature of 390° C., a hydrogen partial pressure of 13.7 MPa, a liquid space velocity of 1.0 hr$^{-1}$, and a hydrogen/oil ratio of 670 L/L. FIG. 2 shows the change in the demetalization rate with respect to the amounts of nickel and vanadium build-up for various catalysts (only #011, #013, #5521, #5523, and #5534).

Figure 3:
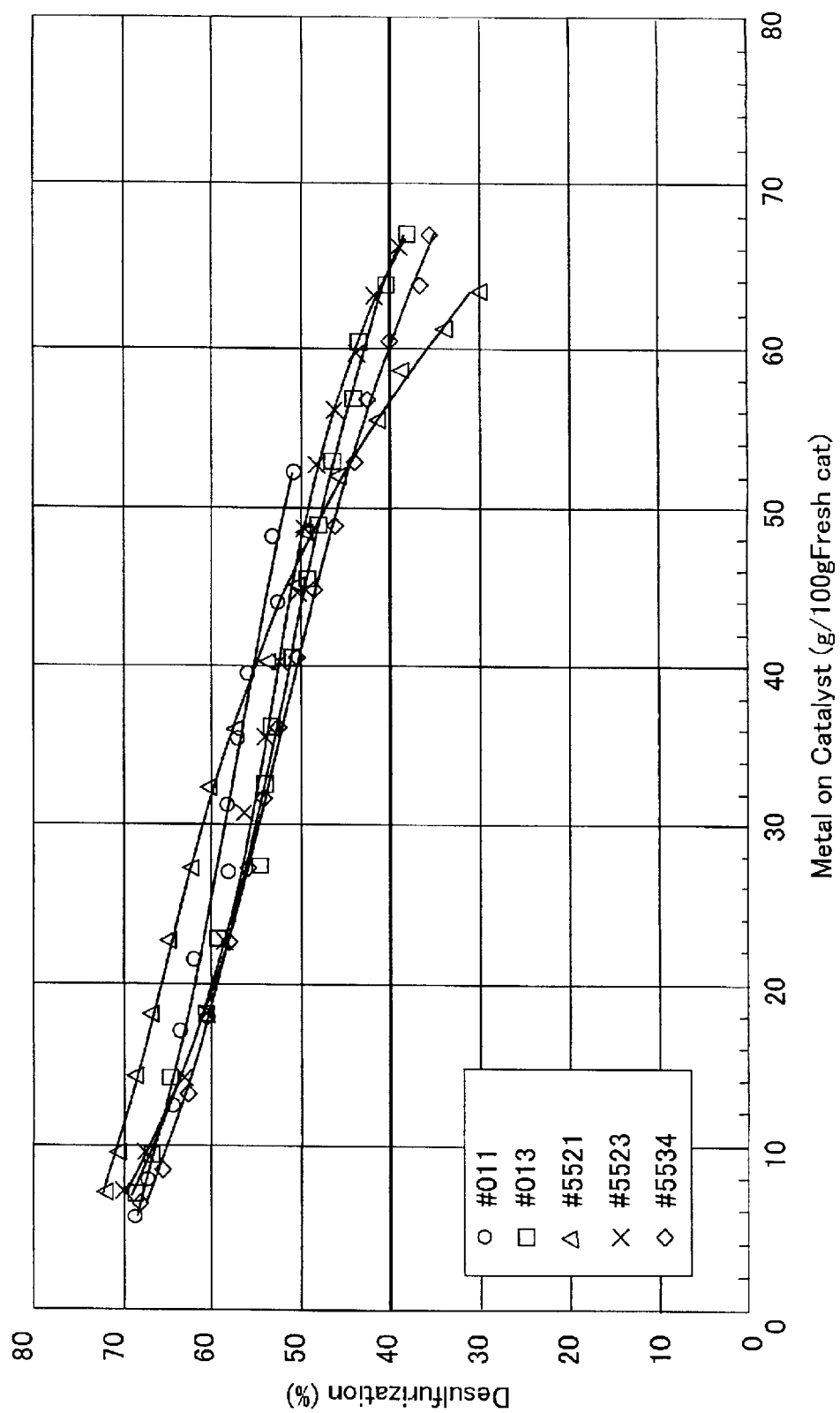
FIG. 3 is a graph of the desulfurization rate versus the amount of nickel and vanadium build-up of a catalyst manufactured in an example.

FIG. 3 shows the change in the desulfurization rate with respect to the amounts of nickel and vanadium build-up for various catalysts (only #011, #013, #5521, #5523, and #5534).

Results of Catalyst Evaluation

The results of evaluating the catalysts used above are compiled in Tables 4 and 5. The pore volume at 60 nm or less was measured by nitrogen adsorption method, while the pore volume at 50 nm or more and 2000 nm or more was measured by mercury intrusion porosimetry. The pore volume at 50 nm or more measured by nitrogen adsorption method was 0.70 cm$^3$/g for catalyst #100 and 0.76 cm$^3$/g for catalyst #606. FIG. 1 shows the pore diameter distribution up to 60 nm for various catalysts (#011, #013, #5521, #5523, #5534, and #5535). It can be seen that #011, #013, #5523, #5534, and #5535) pertaining to the present invention all exhibit an extremely broad band over the range of 8 to 60 nm.

TABLE 4

| | Catalyst No. | | | |
|---|---|---|---|---|
| | #100 | #606 | #611 | #802 |
| Effective metal build-up amount in demetalization reaction | 127 | 64 | 53 | — |
| Effective metal build-up amount in desulfurization reaction | — | — | 54 | — |
| Reaction rate constant k0$_h$ with respect to hard desulfurization compounds | 0.25 | — | 0.41 | 0.57 |
| Reaction rate constant k0$_e$ with respect to easy desulfurization compounds | 3.46 | — | 4.07 | 4.61 |
| Specific surface area (m$^2$/g) | 188 | 248 | 165 | 231 |
| Median pore diameter (nm) | 12.1 | 9.1 | 16.5 | 9.1 |
| Pore volume at 60 nm or less | | | | |
| Total volume (mL/g) | 0.71 | 0.77 | 0.77 | 0.62 |
| 8 nm or less | 8.5% | 36.4% | 2.6% | 33.9% |
| 8–14 nm | 53.5% | 45.5% | 31.2% | 64.5% |
| 14–20 nm | 22.5% | 9.1% | 41.6% | 1.6% |
| 20–30 nm | 9.9% | 5.2% | 22.1% | 0% |
| 30–60 nm | 5.6% | 3.9% | 2.6% | 0% |
| Pore volume at 50 nm or more (mL/g) | 0.383 | 0.310 | — | — |
| Pore volume at 2000 nm or more (mL/g) | 0.004 | 0.000 | — | — |

TABLE 5

| | Catalyst No. | | | | | |
|---|---|---|---|---|---|---|
| | #011 | #013 | #5521 | #5523 | #5534 | #5535 |
| Effective metal build-up amount in demetalization reaction | 90 | 69 | 59 | 66 | 67 | — |
| Effective metal build-up amount in desulfurization reaction | 68 | 64 | 56 | 64 | 60 | — |
| Reaction rate constant k0$_h$ with respect to hard desulfurization compounds | 0.38 | 0.35 | — | — | — | — |
| Reaction rate constant k0$_e$ with respect to easy desulfurization compounds | 3.29 | 3.85 | — | — | — | — |
| Specific surface area (m$^2$/g) | 174 | 176 | 180 | 170 | 157 | 168 |
| Median pore diameter (nm) | 16.6 | 19.1 | 16.1 | 16.5 | 19.2 | 18.1 |

TABLE 5-continued

|  | Catalyst No. | | | | | |
| --- | --- | --- | --- | --- | --- | --- |
|  | #011 | #013 | #5521 | #5523 | #5534 | #5535 |
| Pore volume at 60 nm or less | | | | | | |
| Total volume (mL/g) | 0.80 | 0.81 | 0.81 | 0.72 | 0.75 | 0.77 |
| 8 nm or less | 3.3% | 3.8% | 3.8% | 5.0% | 4.7% | 4.6% |
| 8–13 nm | 26.9% | 20.0% | 22.3% | 25.1% | 17.4% | 17.4% |
| 13–18 nm | 26.7% | 21.9% | 41.4% | 28.0% | 20.6% | 27.3% |
| 18–30 nm | 40.9% | 47.6% | 29.8% | 39.7% | 54.4% | 48.2% |
| 30–60 nm nm | 2.1% | 6.7% | 2.6% | 2.3% | 2.9% | 2.5% |

Evaluation of Catalyst Life

Figure 4:
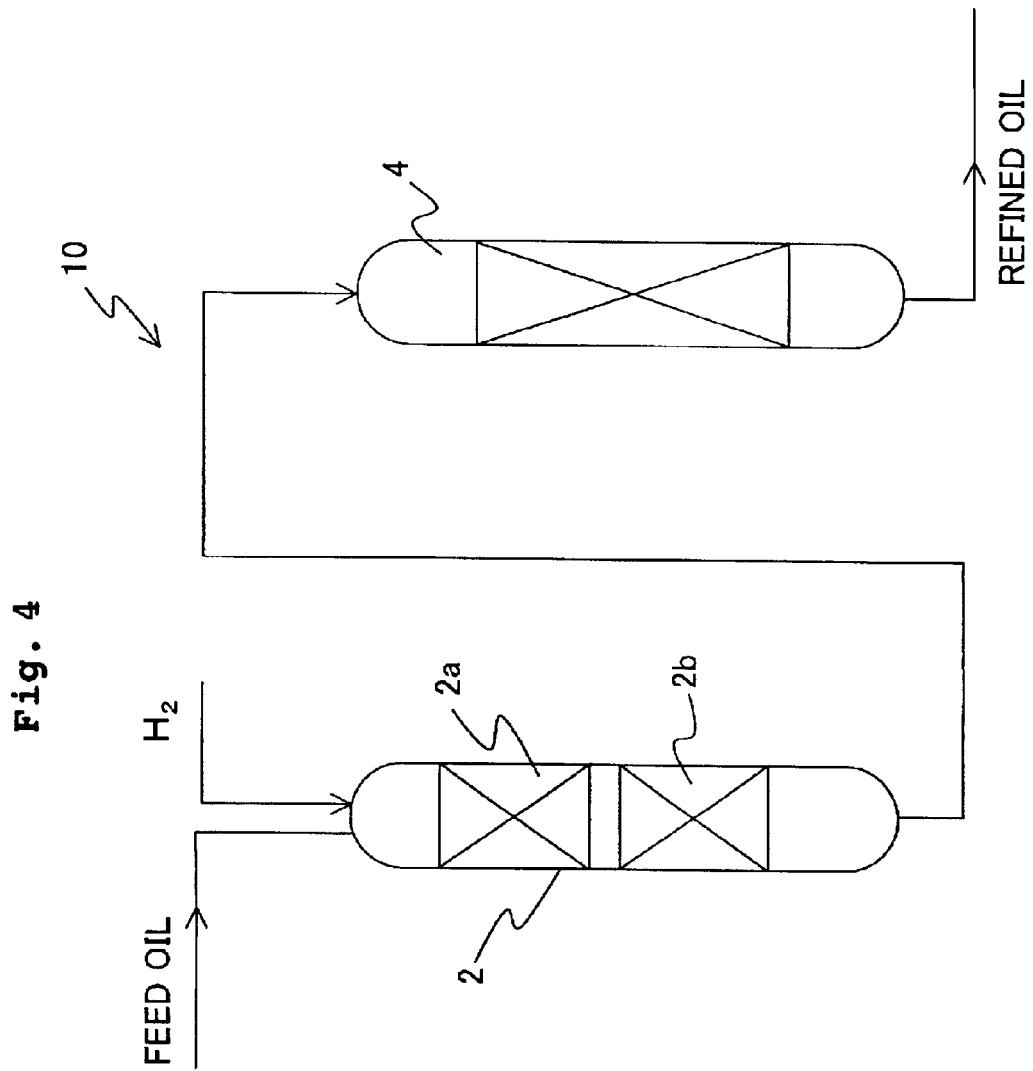
FIG. 4 is a concept diagram illustrating a specific example of the hydrorefining apparatus according to the present invention.

The three catalyst combinations shown in Table 6 were evaluated for catalyst life by performing hydrorefining using the mixed distillation residue shown in Table 3 as the feed oil. Each catalyst combination was packed in the hydrorefining apparatus 10 shown in FIG. 4. The hydrorefining apparatus 10 was equipped with a first reactor 2 and a second reactor 4 with an inside diameter of 25 mm and a length of 1000 mm. A catalyst layer 2a located on the upstream side of the first reactor 2 was packed with an upper catalyst, and a catalyst layer 2b located on the downstream side was packed with a middle catalyst. The catalyst layer of the second reactor 4 was packed with a lower catalyst. Table 6 shows the amounts in which the various catalyst layers were packed with catalyst. The reactors are provided with a temperature regulator (not illustrated) on the periphery thereof. The reaction conditions comprised a hydrogen partial pressure of 14 MPa, a hydrogen/oil ratio of 800 L/L, and a liquid space velocity of 0.36 hr$^{-1}$ in accelerated test mode and 0.27 hr$^{-1}$ in evaluation conditions mode, which is closed to the actual operating conditions. The evaluation was conducted by operating the apparatus for 7300 hours under the conditions of the accelerated test mode, and operating the apparatus in evaluation conditions mode during this time and evaluating the catalyst activity. The reaction temperature of the catalyst layers was fine-tuned so that the sulfur would be contained in an amount of 0.5% in the 360° C. and higher fractions of the reaction product oil, and the lower catalyst layer was set to a temperature 10° C. higher than that in the upper and middle catalyst layers.

TABLE 6

|  | Combination 1 (Example 1) | Combination 2 (Example 2) | Combination 3 (Comparative Example) |
| --- | --- | --- | --- |
| Upper catalyst | catalyst #100 | catalyst #100 | catalyst #606 |
| Packing amount (v %) | 26 | 24 | 14 |
| Middle catalyst | catalyst #011 | catalyst #011 | catalyst #611 |
| Packing amount (v %) | 32 | 21 | 22 |
| Lower catalyst | catalyst #802 | catalyst #802 | catalyst #802 |
| Packing amount (v %) | 42 | 55 | 64 |
| Ratio of reaction rate constant of hard desulfurization compounds with middle catalyst and lower catalyst | 0.67 | 0.67 | 0.72 |

TABLE 6-continued

|  | Combination 1 (Example 1) | Combination 2 (Example 2) | Combination 3 (Comparative Example) |
| --- | --- | --- | --- |
| Catalyst life (days) | 300 plus | 307 | 242 |
| Demetalization rate (%) | 91.0 | 86.1 | 82.7 |
| Average cracking rate (%) | 16.2 | 12.8 | 12.2 |

Figure 5:
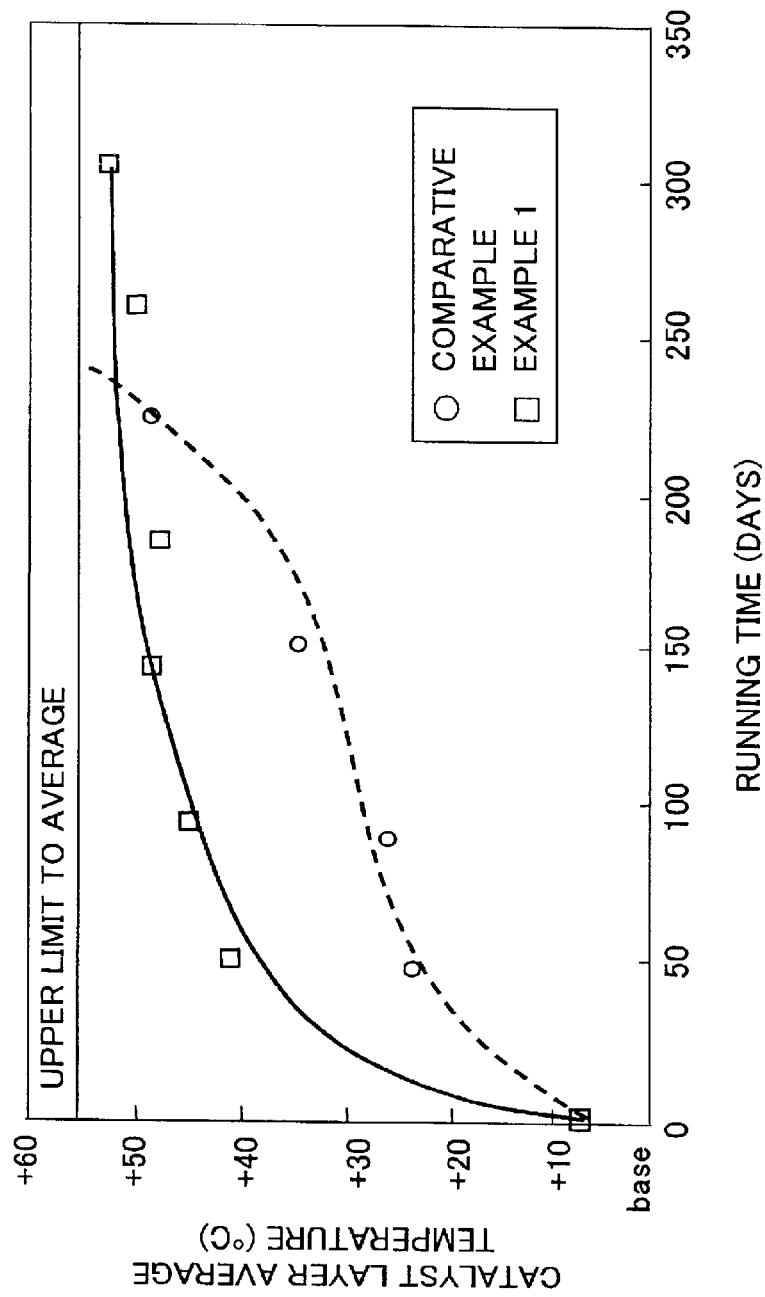
FIG. 5 is a graph of the change over time in the reaction temperature in Example 1 of the present invention and a Comparative Example.
Figure 6:
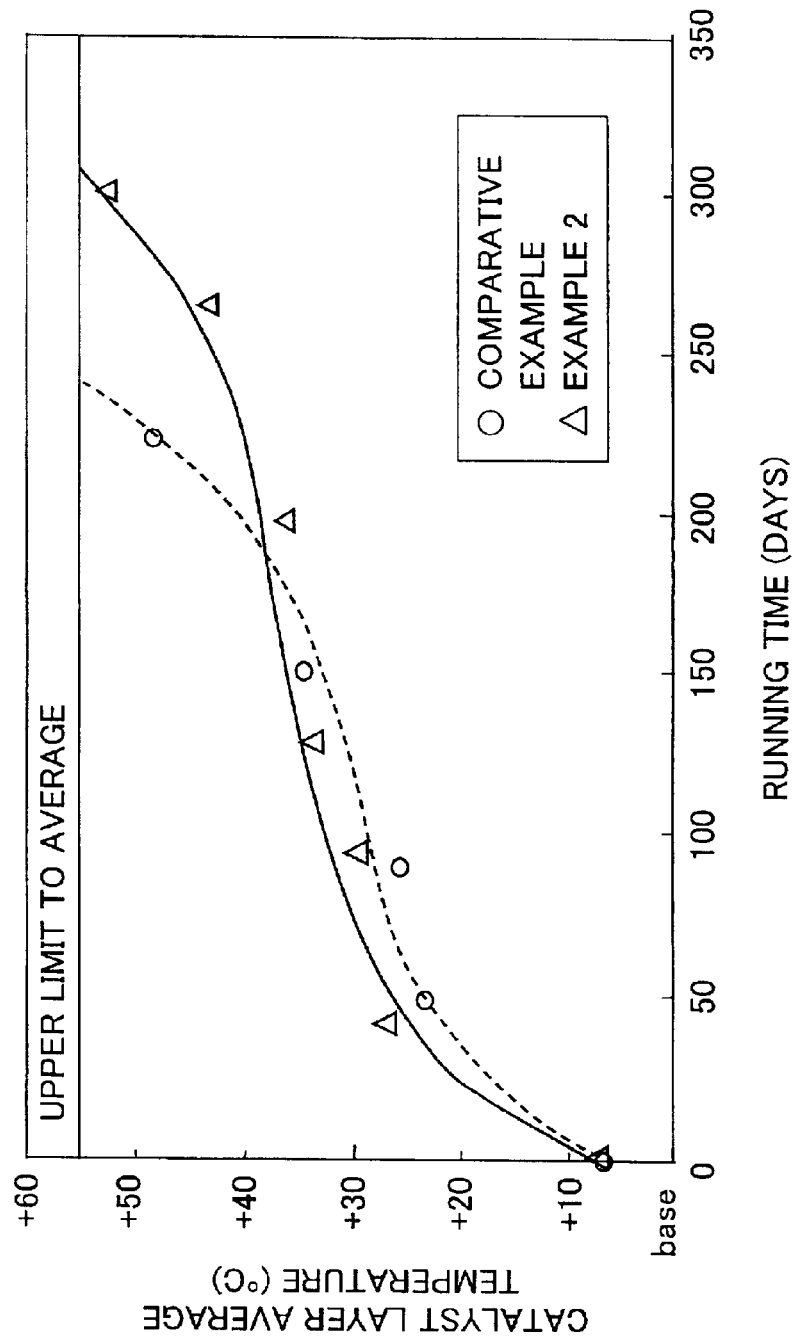
FIG. 6 is a graph of the change over time in the reaction temperature in Example 2 of the present invention and a Comparative Example.

FIGS. 5 and 6 show the change in the catalyst weight average temperature in the evaluation conditions mode. Compared to combination 3 (comparative example), combinations 1 and 2 (examples) have a higher temperature at the start of operation, but there is less increase in temperature over the course of extended operation. It can be seen that with combinations 1 and 2 (examples), there is little catalyst degradation even after extended operation at high temperature, so the service life is longer. If we let the catalyst life be the number of operating days until the catalyst weight average temperature reaches 405° C., this life was 300-plus days in the examples, but was only 242 days in the comparative example. It can also be seen that the examples are superior to the comparative example in terms of the average demetalization rate and average cracking rate up to that point.

Industrial Applicability

The present invention can provide a catalyst with excellent demetalization characteristics and desulfurization characteristics, and a hydrorefining method and a hydrorefining apparatus with which removal performance for impurities such as metals or sulfur is high and can be maintained high over an extended period, and with which a larger quantity of light distillates can be obtained.

What is claimed is:

1. A hydrorefining catalyst comprising a porous carrier and a hydrogenation active metal supported thereon, wherein the total volume of pores with a diameter of 60 nm or less is at least 0.5 mL/g;
   (i) the volume of pores with a diameter of 8 nm or less is no more than 8% of the total pore volume;
   (ii) the volume of pores with a diameter of 8 to 13 nm is at least 15% of the total pore volume;
   (iii) the volume of pores with a diameter of 13 to 18 nm is not more than 30% of the total pore volume;
   (iv) the volume of pores with a diameter of 18 to 30 nm is at least 35% of the total pore volume; and (v) the volume of pores with a diameter of 30 to 60 nm is no more than 10% of the total pore volume.

2. The hydrorefining catalyst according to claim 1, wherein the volume of pores with a diameter of 13 to 18 nm is 15% to 30% of the total pore volume.

3. The hydrorefining catalyst according to claim 1, wherein the catalyst has an effective metal build-up amount in a demetalization reaction of at least 50, and an effective metal build-up amount in a desulfurization reaction of at least 50.

4. An apparatus for hydrorefining heavy oils, comprising a plurality of layers comprising:

a first catalyst layer;

a second catalyst layer located downstream from the first catalyst layer, and a third catalyst layer located downstream from the second catalyst layer, wherein an effective metal build-up amount in a demetalization reaction of the catalyst in the first catalyst layer is at least 70, an effective metal build-up amount of the demetalization reaction of the catalyst in the second catalyst layer is at least 50, and an effective metal build-up amount in a desulfurization reaction is at least 50, and wherein the combined volume of the catalyst in the first and second catalyst layers is at least 45% of the combined volume of the catalyst in the first to third catalyst layers, and the volume of the catalyst in the second catalyst layer is at least 10% of the combined volume of the catalyst in the first to third catalyst layers.

5. The hydrorefining apparatus according to claim 4, wherein the catalyst in the first catalyst layer has a refractory porous carrier and a hydrogenation active metal supported on the carrier; and (a) the volume of pores with a diameter of 50 nm or less is at least 0.4 mL/g as determined by nitrogen adsorption method;

(b) the volume of pores with a diameter of at least 50 nm is at least 0.2 mL/g as determined by mercury intrusion porosimetry; and (c) the volume of pores with a diameter of at least 2000 nm is 0.1 mL/g or less as determined by the mercury intrusion porosimetry.

6. The hydrorefining apparatus according to claim 4, wherein the catalyst in the second catalyst layer has a refractory porous carrier and a hydrogenation active metal supported on the carrier, and the total volume of pores with a diameter of 60 nm or less is at least 0.5 mL/g as determined by a nitrogen adsorption method; and (i) the volume of pores with a diameter of 8 nm or less is no more than 8% of the total pore volume;

(ii) the volume of pores with a diameter of 8 to 13 nm is at least 15% of the total pore volume;

(iii) the volume of pores with a diameter of 13 to 18 nm is not more than 30% of the total pore volume;

(iv) the volume of pores with a diameter of 18 to 30 nm is at least 35% of the total pore volume; and (v) the volume of pores with a diameter of 30 to 60 nm is no more than 10% of the total pore volume.

7. A heavy oil hydrorefining method, comprising the steps of:

preparing a first catalyst layer, a second catalyst layer located downstream from the first catalyst layer and a third catalyst layer located downstream from the second catalyst layer; and bringing a heavy oil into contact with the first, second and third catalyst layers in the presence of hydrogen, wherein an effective metal build-up amount in a demetalization reaction of the catalyst in the first catalyst layer is at least 70, an effective metal build-up amount in a demetalization reaction of the catalyst in the second catalyst layer is at least 50, and an effective metal build-up amount in a desulfurization reaction is at least 50, and wherein the combined volume of the catalyst in the first and second catalyst layers is at least 45% of the combined volume of the catalyst in the first to third catalyst layers, and the volume of the catalyst in the second catalyst layer is at least 10% of the combined volume of the catalyst in the first to third catalyst layers.

8. The heavy oil hydrorefining method according to claim 7, wherein there is at least a 0.5 reaction rate constant ratio for compounds that are not completely desulfurized by the catalyst in the second catalyst layer versus a reaction rate constant for compounds that are not completely desulfurized by the catalyst in the third catalyst layer.

9. The heavy oil hydrorefining method according to claim 7, wherein the catalyst in the first catalyst layer has a refractory porous carrier and a hydrogenation active metal supported on the carrier; and (a) the volume of pores with a diameter of 50 nm or less is at least 0.4 mL/g as determined by nitrogen adsorption method;

(b) the volume of pores with a diameter of at least 50 nm is at least 0.2 mL/g as determined by mercury intrusion porosimetry; and (c) the volume of pores with a diameter of at least 2000 nm is 0.1 mL/g or less as determined by the mercury intrusion porosimetry.

10. The heavy oil hydrorefining method according to claim 7, wherein the catalyst in the second catalyst layer has a refractory porous carrier and a hydrogenation active metal supported on the carrier, and the total volume of pores with a diameter of 60 nm or less is at least 0.5 mL/g as determined by nitrogen adsorption method; and (i) the volume of pores with a diameter of 8 nm or less is no more than 8% of the total pore volume;

(ii) the volume of pores with a diameter of 8 to 13 nm is at least 15% of the total pore volume;

(iii) the volume of pores with a diameter of 13 to 18 nm is not more than 30% of the total pore volume;

(iv) the volume of pores with a diameter of 18 to 30 nm is at least 35% of the total pore volume; and (v) the volume of pores with a diameter of 30 to 60 nm is no more than 10% of the total pore volume.

11. The heavy oil hydrorefining method according to claim 10, wherein the volume of pores with a diameter of 13 to 18 nm is 15 to 30% of the total pore volume.

* * * * *

UNITED STATES PATENT AND TRADEMARK OFFICE
CERTIFICATE OF CORRECTION

PATENT NO.     : 6,858,132 B2
DATED          : February 22, 2005
INVENTOR(S)    : Kumagai et al.

It is certified that error appears in the above-identified patent and that said Letters Patent is hereby corrected as shown below:

Title page,
Item [30], Foreign Application Priority Data, please change the following:
"[30]  Foreign Application Priority Data
June 5, 2000     (JP)............................2000-171428" to read:
-- [30] Foreign Application Priority Data
June 8, 2000     (JP)............................2000-171428 --

Signed and Sealed this

Twenty-fourth Day of May, 2005

JON W. DUDAS
*Director of the United States Patent and Trademark Office*